United States Patent [19]

Vaughan

[11] Patent Number: 4,479,710
[45] Date of Patent: Oct. 30, 1984

[54] APPARATUS FOR STORING, TRANSPORTING AND EXPOSING PHOTOSENSITIVE FILM FOR CAMERA

[75] Inventor: Quentin D. Vaughan, Hollywood, Fla.

[73] Assignee: Visual Graphics Corporation, Tamarac, Fla.

[21] Appl. No.: 483,915

[22] Filed: Apr. 11, 1983

Related U.S. Application Data

[63] Continuation-in-part of Ser. No. 353,637, Mar. 1, 1982.

[51] Int. Cl.$^3$ ............................................. G03B 29/00
[52] U.S. Cl. ........................................ 355/28; 355/64
[58] Field of Search .................... 355/28, 45, 60, 64, 355/27; 354/283

[56] References Cited

U.S. PATENT DOCUMENTS

| | | |
|---|---|---|
| 2,415,424 | 2/1947 | Gaebel . |
| 2,751,814 | 6/1956 | Limberger . |
| 3,055,266 | 5/1962 | Frantz et al. ........................ 355/45 |
| 3,259,046 | 7/1966 | Nishimura . |
| 3,398,638 | 8/1968 | Frohlich . |
| 3,536,401 | 10/1970 | Mason et al. . |
| 3,689,150 | 9/1972 | Nothmann et al. . |
| 4,408,872 | 10/1983 | Vaughn ................................ 355/28 |

Primary Examiner—L. T. Hix
Assistant Examiner—Della J. Rutledge
Attorney, Agent, or Firm—Albert F. Kronman

[57] ABSTRACT

Apparatus for storing, transporting, and exposing photosensitive film is disclosed in which a camera supports a table along which a carriage is slidable. The carriage serves to store and feed out lengths of film into a camera exposure station. A vacuum bar is carried by the table at one end thereof so as to underlie one margin of the film. A source of vacuum is connected to the vacuum bar. A sheet of flexible plastic material overlying a translucent platen for the camera is located at the exposure station. Application of vacuum to the vacuum bar causes the film to be flattened against the platen by atmospheric pressure for film exposure.

10 Claims, 8 Drawing Figures

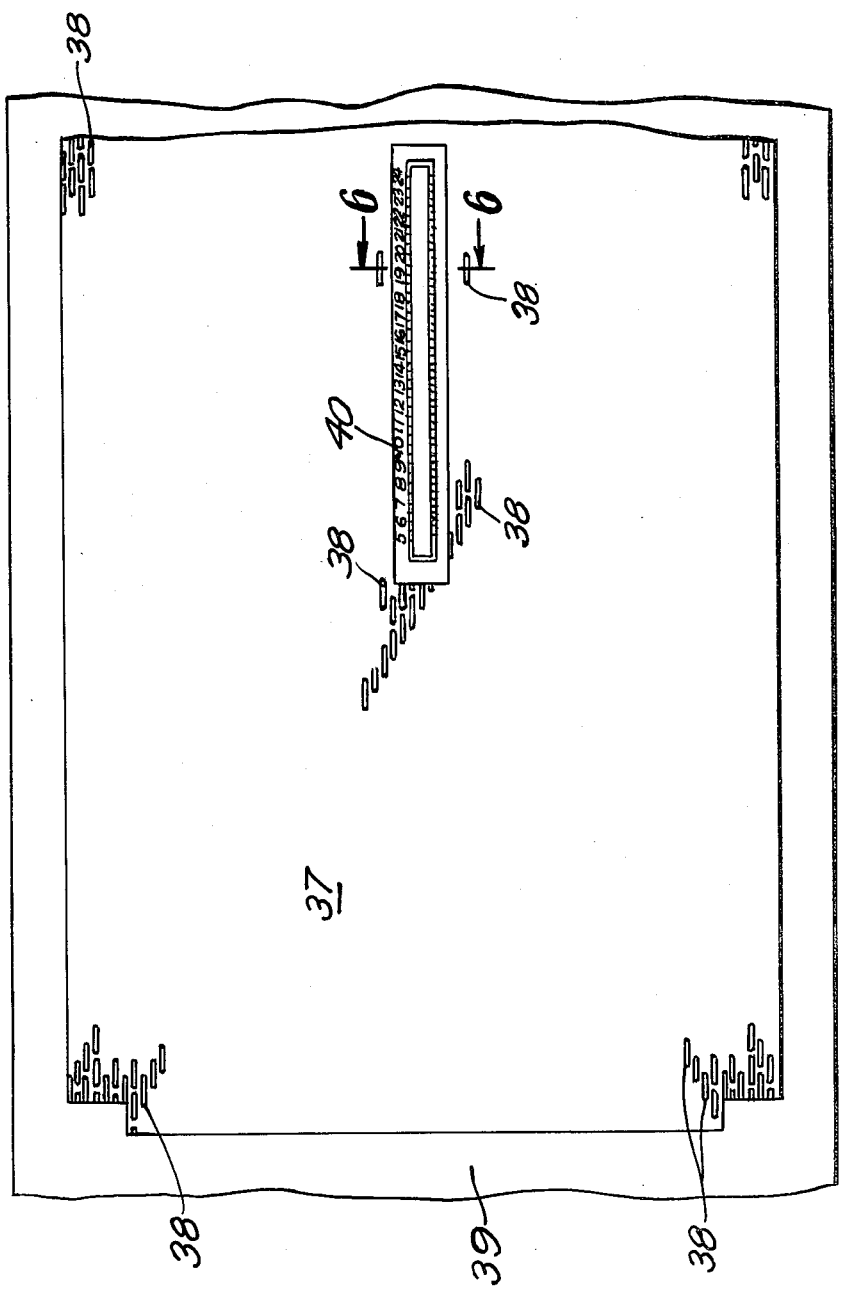
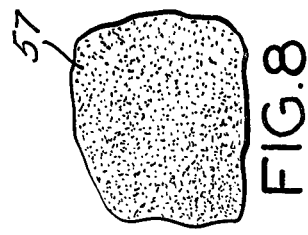
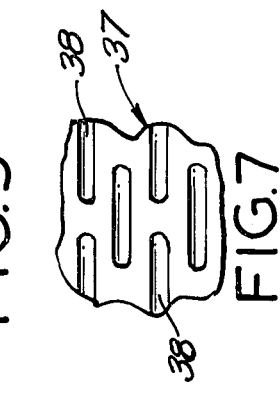
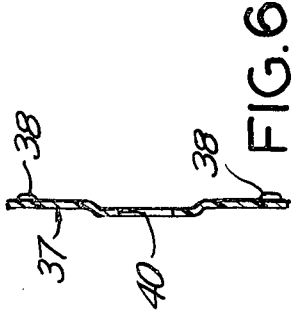

APPARATUS FOR STORING, TRANSPORTING AND EXPOSING PHOTOSENSITIVE FILM FOR CAMERA

BACKGROUND OF THE INVENTION

CROSS-REFERENCE TO RELATED APPLICATION

This application is a continuation in part of an application for patent entitled Combined Storing, Transporting, Exposing and Processing Apparatus for Camera filed Mar. 1, 1982, Ser. No. 353,637; Quentin Vaughan, inventor.

In the prior application there is disclosed a horizontal table secured to a camera at the focal plane end thereof and disposed parallel to said focal plane. A carriage within which there is disposed an elongated strip of photosensitive material, hereinafter referred to as "film", serves to store and feed out lengths of film which are directed across a transparent plate carried at the camera focal plane. A sheet of opaque flexible plastic material overlies the film as it is directed upon the transparent plate. Before an exposure is made, a source of vacuum is employed to remove the air from between the film, the transparent plate and the sheet of flexible plastic. The sheet is thereby substantially flattened upon the film to hold it in contact with the transparent plate and at the focal plane.

In the present invention there has been provided improved structures whereby the uniformity of the pressure upon the film has been greatly improved.

Another feature of the present invention is the use of certain patterns or embossments upon the flexible sheet to insure smooth passage of the film as it slides across the transparent plate beneath the plastic sheet.

Still another feature of the present invention is the provision of lateral supports for the plastic sheet to improve film insertion and release.

A feature of the present invention is its transverse vacuum bar adjacent the trailing end of the film through which the air beneath the plastic sheet and film is removed.

SUMMARY OF THE INVENTION

An elongated, flexible sheet of opaque plastic is secured to a spring loaded roller carried within a light tight carriage. The carriage is slidably mounted upon a table attached to the focal plane end of a camera and parallel to said plane. An elongated length of film is received within the carriage which also serves to advance a length of the film across the table beneath the flexible plastic sheet and into position upon a transparent plate disposed in the focal plane of the camera. The plastic sheet has an embossed or textured surface which is in contact with the film as it is advanced into the exposing station of the camera. A vacuum bar is carried by the table adjacent the trailing edge of the film and transversely thereof. When a source of vacuum is applied to the vacuum bar, the ambient atmospheric pressure first presses the flexible plastic sheet against the film. As evacuation continues, the said sheet is progressively flattened in the direction away from the vacuum bar so that the air is squeegeed out from under the film and plastic sheet causing an even, flat pressure to be applied over the entire surface of the film so that it is uniformly held at the focal plane of the camera.

BRIEF DESCRIPTION OF THE DRAWINGS

In the accompanying drawings forming part hereof, similar parts have been given the same reference numerals, in which drawings:

FIG. 5 is a plan view of a portion of the table shown in FIG. 2 with its opaque plastic cover sheet in place for exposure.

FIG. 6 is a cross sectional view taken on line 6—6 in FIG. 5.

FIG. 7 is a fragmentary plan view of one embodiment of the plastic cover sheet of FIG. 5, somewhat enlarged.

FIG. 8 is a fragmentary plan view of a second embodiment of the plastic cover sheet useful in the present invention, somewhat enlarged.

DETAILED DESCRIPTION

Figure 1:
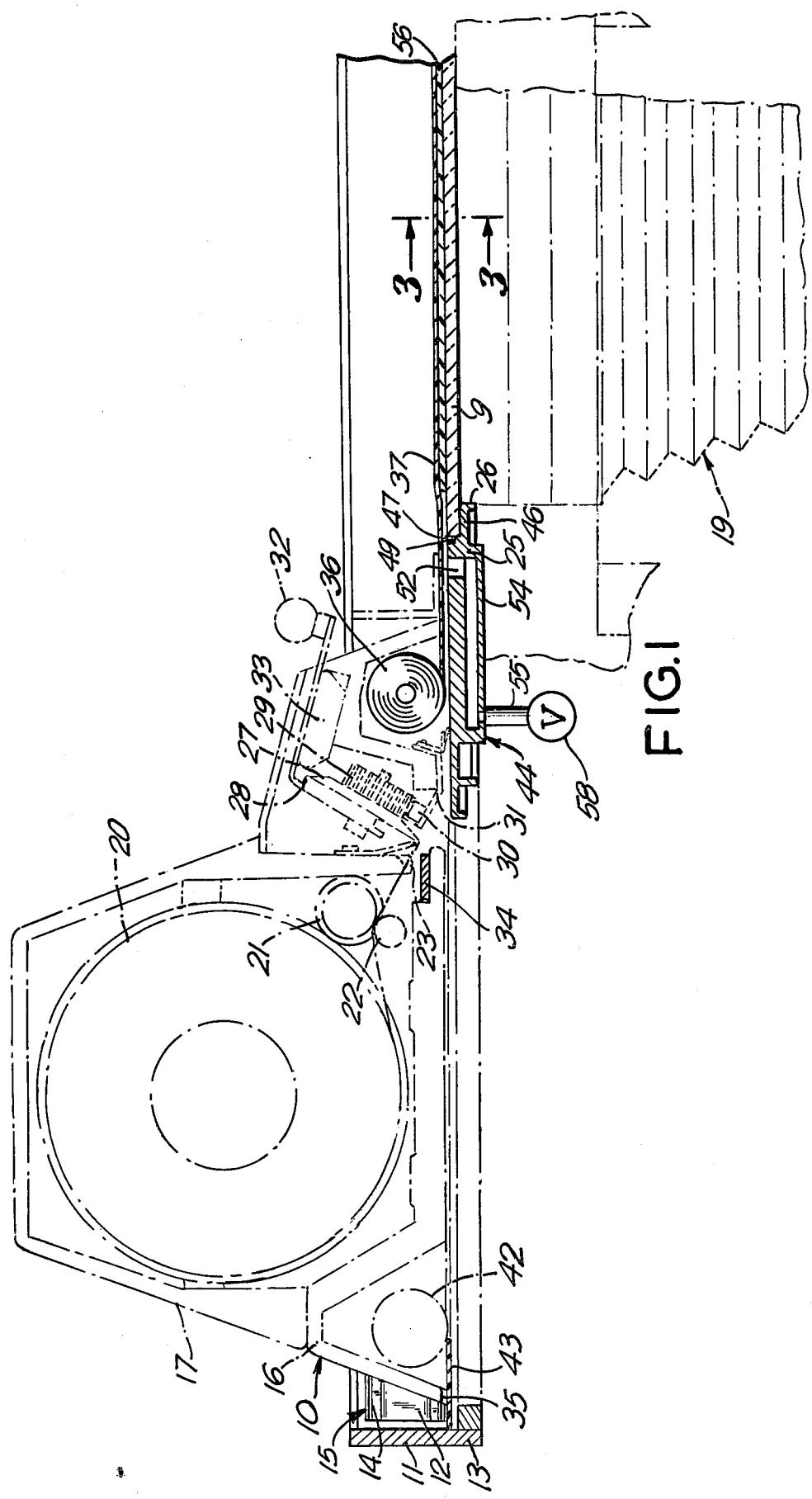
FIG. 1 is a view in longitudinal cross section, partly in dashed lines, of the film storing, transporting and exposing apparatus of the present invention.

Referring to the drawings and particularly to FIGS. 1-4, there is shown the film storing, transporting and exposing portion of an attachment for a large format industrial camera, more fully described in copending U.S. patent application, Ser. No. 353,637. The illustrated attachment comprises a transport section 10 slidably carried upon a bed 11 which in turn is secured to the horizontal top members of a vertical camera 19. The bed is preferably made of metal or some other suitably rigid material and consists of spaced parallel side members 12 and end members 13. The inner faces of the side members are provided with elongated tracks 14 which form part of a slide bearing assembly 15 on each side of the bed 11.

A carriage 16, hereinafter referred to as the cassette carriage, is secured to the movable portion of the slide bearings 15. The cassette carriage 16 serves to move the transport section 10 along the spaced parallel side members 12.

The cassette housing 17 on the carriage 16 provides a light tight enclosure for a roll of film 20 for the camera. The leading edge of the film is guided through a first pair of rollers 21, 22 which direct the film through a slot 23 formed between the bottom of the cassette housing base and the housing 17. A control knob (not shown) is used to rotate the rollers 21, 22 to advance additional film out of the cassette housing 17 and onto and across a table 25 carried by the bed 11 of the transport section 10. The table 25 also carries the camera platen 9, preferably made of glass, within a window 26 of the said bed. It will be seen that as the sheet of film is fed out of the said cassette with its photosensitive face down, it will be guided across the platen 9 and lie in the path of light directed through the camera 19.

When the photosensitive sheet of film 20 has been extended for the desired length necessary for the size image to be produced, it is cut from the supply roll by means of a rotary knife blade 27. The rotary knife blade 27 is pivotally carried on the end of an arm 28 and is secured to a spur gear 29 which is in mesh with a gear rack 30 attached to a bracket 31. An operating handle 32 is connected to the arm 28 and serves to move the rotary knife assembly along the slide bearing 33 which is carried by the bracket 31 so that the blade will sever the film as the rotary knife blade 27 passes across the shearing edge of a plate 34.

Secured at each end in the sides of the cassette carriage 16 is an elongated roller 36 (hereinafter referred to as the front roller). The front roller is spring loaded, in the wellknown manner, so that it will return to its original position when released after being rotated several times. This mechanism can be compared to a shade roller which will not stop and lock at a set position. The front roller is located above the table 25 and slightly in advance of the leading edge of the film 20 as it is first fed out of the cassette 17. An elongated sheet 37 of some suitable flexible material such as vinyl, plastic, nylon or the like, is secured at one end to the front roller 36 and initially wrapped therearound so that the sheet is continually urged upon or taken up by the said roller.

As best shown in FIGS. 5-8, the sheet 37 is provided with small protuberances or embossments 38 which provide passages therebetween for air. In addition, the sheet 37 may be provided with an elongated window 40 which may consist of a transparent section of light filtering material in an otherwise opaque flexible sheet. The window 40 provides an area through which the leading edge of film to be exposed may be observed. Where the film is color film, the window 40 will, of course, be eliminated. The free end of the flexible sheet 37 is secured to an elongated metal loop (not shown) by means of which the sheet 37 may be extended across the table top and anchored prior to the operation of the exposing section of the device.

A second roller 42, hereinafter called the rear roller is also carried by the cassette carriage in the sides of said carriage. The roller 42 is also spring loaded but in the opposite direction from the front roller. An elongated flat opaque flexible sheet 43 made of plastic material is secured at one end to the rear roller and at its other end to the bed 11 as best shown in FIG. 1. It will be observed that when the cassette carriage 16 is at the extreme left end of the bed 11, the sheet 43 will be wound upon the roller 42. As the carriage 16 is slid away from the end of the bed 11, the sheet 43 will be unwound from the rotating roller 42 and overlie the surface of the table 25 to prevent light from getting into the camera. The sheet 43 is directed through a slot 35 at the base of the cassette carriage 16 so that the carriage may freely move back and forth along the bed as the sheet 43 is extended or taken up.

An elongated plate 44, hereinafter called the vacuum bar, is transversely disposed in the path of the cassette carriage 16 as shown in FIG. 1. The top surface of the vacuum bar 44 is planar and aligned with the top surface of the table 25 within which the platen 9 is carried and across which the film 20 is fed during the operation of the arraratus.

Figure 2:
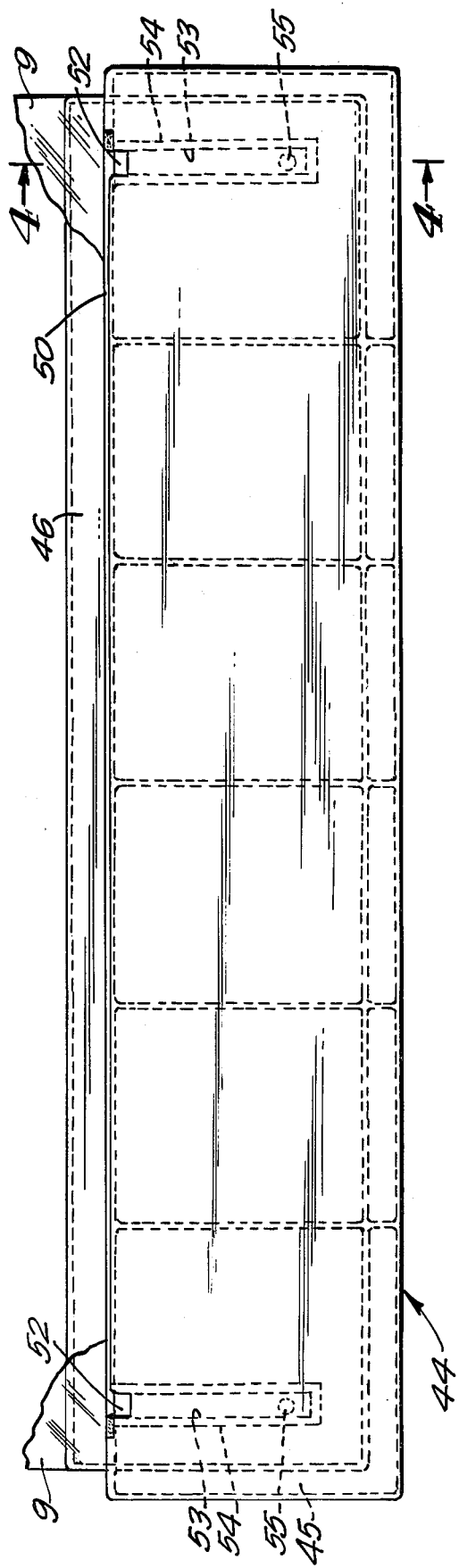
FIG. 2 is a plan view of a portion of the film receiving and positioning table shown in FIG. 1.
Figure 4:
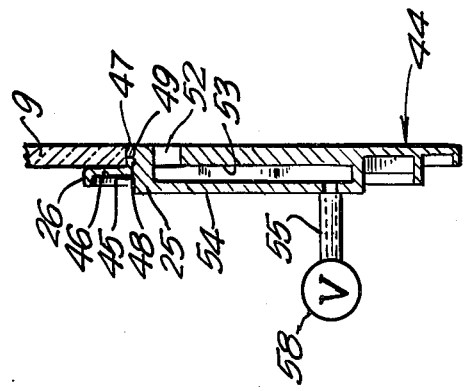
FIG. 4 is a cross sectional view taken on line 4—4 in FIG. 2, looking in the direction of the arrows.

As best shown in FIGS. 2 and 4, the vacuum bar is provided with a stepped flange 45 which supports one end of the platen 9. Since the platen is held on the lower step 46 of the flange, the edge 47 of the platen is spaced from the upper step 48 as indicated at 49. The elongated groove 50 thus formed, (see FIG. 2) forms a channel through which air between the film 20, the platen 9 and flexible sheet 37 may be removed as hereinafter more fully described. The groove 50 is sealed at each end by means of a suitable material such as a plastic sealant 51. A small recess 52 cut into the top of the vacuum bar serves to connect the groove 50 with a chamber 53 within a fitting 54 secured to the bottom of the vacuum bar 44, as best shown in FIG. 4. The fitting 54 is provided with a tubular port 55 which is in communication with the interior of the chamber 53 at one end and connected to the vacuum source (not shown) at its other end.

If desired, a pair of fittings 54 may be secured at each end of the groove 50 as shown in FIG. 2 and connected to the same or two separate vacuum sources.

Figure 3:
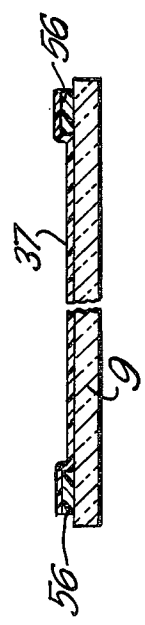
FIG. 3 is a cross sectional view taken on line 3—3 in FIG. 1, looking in the direction of the arrows.

Referring to FIG. 3, it will be seen that an elongated strip 56 of some suitable material such as plastic is secured adjacent each of the longitudinal edges of the top of the glass platen 9. The strips are preferably 1/32 inch thick and of the order of ½ inch wide. The location of the strips is such that they underlie the flat portions along the elongated sides of the flexible sheet 37 and extend to the far end of the platen 9. The purpose of the strips is to lift the flexible sheet 37 from the surface of the platen after the vacuum source is released, thereby helping to break the vacuum and permit exposed film to be advanced and additional film to be placed upon the platen.

The protuberances 38 on the flexible sheet 37, best shown in FIGS. 5-8, form one of the important parts of the present invention. In order to properly produce a satisfactory image upon the film, the entire area of the film must be disposed upon the image plane of the camera. Since the present device employs atmospheric pressure to hold the film upon the image plane, any ripples or bubbles caused by pockets of air beneath the film will result in poorly imaged areas. It is also desirable to keep the size of the vacuum source down for economic, noise and other considerations. It has been found that the presently disclosed apparatus achieves these requirements.

In the embodiment shown in FIGS. 5 and 7, the protuberances 38 consist of an embossment in the flexible sheet 37 in the form of staggered spaced rows of elongated dimples of the order of 0.750 inch long and 0.125 inch wide. A radius of 0.062 inch is provided at each end of the dimple. The protuberances 38 extend downwardly toward the platen 9.

When the film is fed upon the platen and beneath the protuberances, the leading edge of the paper slides easily into place with the protuberances resting uniformly on the back surface of the film. The protuberances are separated 0.12 inch longitudinally and are 0.25 inch apart to leave interconnected channels therebetween.

As the vacuum source connected to the fitting 54 is activated, it will be observed that atmospheric pressure depresses the flexible sheet first along a line parallel to the elongated groove 50 between the glass platen 9 and the stepped flange 45. Continued pumping of the air from beneath the flexible sheet causes the atmospheric pressure to flatten the sheet progressively in the direction toward the opposite end thereof with a squeegee-like action which uniformly forces all the air out from between the protrusions, flattening them against the film. The film 20 is thus firmly and completely held against the image plane of the camera.

The squeegee-like action of the differential air pressure is quite surprising in as much as it would be assumed that the evacuation of air from beneath the flexible sheet 37 would result in additional air geing pulled in from the periphery of the flexible sheet 37 so that there would be no flattening of the sheet upon the film in the desired manner. In fact, applicant tried many configurations, including a plurality of grooves and hold-down structures, before discovering that the desired application of unifrom pressure by the application of a vacuum source could be best be achieved in the manner disclosed herein.

After the exposure has been made, the vacuum source is interrupted as by any suitable valve means 58 and the vacuum is broken. Air enters the spaces between the protuberances and the flexible sheet 37 returns to its normal shape. The elongated strips 56 on the platen help to break the vacuum at this time as the flexible sheet 37 recovers from the flattened shaped shown in FIG. 3 to its unstressed condition.

It will be apparent to those skilled in the art that other forms of embossments may be used in the flexible sheet 37 without departing from the spirit of the invention.

FIG. 8 illustrates another embodiment of the invention in which the sheet is made with a very fine pattern 57 on one side thereof known as a hair cell pattern. This pattern consists of many fine protuberances extending from the sheet, which are placed so as to be against the film to be exposed. The very small spaces between the protuberances permit the air to be drawn out from beneath the flexible sheet 37 as atmospheric pressure squeegees the flexible sheet against the film.

The squeegee-like action of the present device permits all of the air to be pressed out of the area beneath the flexible sheet 37 without need for additional grooves around the entire periphery of the sheet and with a continuous smooth action.

Having thus fully described the invention, what is claimed is:

1. Apparatus for use in combination with a camera having an object plane and an image plane comprising:
   a. an elongated table coupled to the camera having a top surface parallel to the image plane of the camera;
   b. a film transport section slidably carried on the table at one end thereof;
   c. a light tight cassette on the transport section;
   d. a supply of imaging film in said cassette;
   e. means carried by the transport section to advance at least a portion of the imaging film from the cassette on to the table;
   f. a transparent platen carried by the table to receive light directed through the camera from the object plane;
   g. an elongated flexible sheet of light filtering material yieldably secured at one end within the transport section and adapted to be extended from said transport section along the table to overlie the platen;
   h. control means to advance the imaging film across the table and beneath the light filtering material to overlie the platen;
   i. a vacuum bar carried by the table adjacent the platen and beneath the elongated flexible sheet;
   j. an elongated groove between the platen and the vacuum bar;
   k. a fitting to couple a vacuum source to said groove;
   l. valve means to control the vacuum source to evacuate air from the space between the flexible sheet and the platen to first create a pressure differential across the said flexible sheet in the area above the elongated groove to bring the film into contact upon the platen in said area and thereafter squeegee the remaining air out of the space between the flexible sheet and the platen; and
   m. means, including said valve means, to interrupt the vacuum source and release the atmospheric pressure against the flexible sheet and the film.

2. Apparatus according to claim 1 in which the flexible sheet is embossed to provide a plurality of closely spaced depending protuberances extending from the plane of the flexible sheet in the direction of the film.

3. Apparatus according to claim 2 in which the protuberances overlie substantially the entire surface of the platen.

4. Apparatus according to claim 2 in which the flexible sheet is provided with a peripheral flat strip around the embossed portion.

5. Apparatus according to claim 2 in which a thin, elongated strip of material is secured along each of the longitudinal margins of the platen, extending upwardly therefrom.

6. Apparatus according to claim 2 in which the protuberances are in the form of staggered rows of elongated dimples.

7. Apparatus according to claim 6 in which the dimples are of the order of 0.750 inch long and 0.125 inch wide, having a radius at each end thereof.

8. Apparatus according to claim 1 in which the flexible sheet has a surface in the form of a hair cell pattern on one side thereof and facing the platen.

9. Apparatus according to claim 1 in which the vacuum bar is formed with a stepped flanged portion to receive the platen thereon in spaced relationship to the rest of the said vacuum bar, whereby an elongated transverse groove is provided between the vacuum bar and said platen.

10. Apparatus according to claim 9 in which the vacuum bar is formed with an interior chamber in communication with the groove and connected to the valve means.

* * * * *